June 1, 1954 R. THORENSEN 2,680,156

MAGNETIC HEAD FOR PERPENDICULAR RECORDING

Filed June 9, 1951

Inventor:
Ragnar Thorensen,
by Merton D. Moore
His Attorney.

Patented June 1, 1954

2,680,156

UNITED STATES PATENT OFFICE 2,680,156

MAGNETIC HEAD FOR PERPENDICULAR RECORDING

Ragnar Thorensen, Baldwinsville, N. Y., assignor to General Electric Company, a corporation of New York Application June 9, 1951, Serial No. 230,775

8 Claims. (Cl. 179—100.2)

Figure 1:
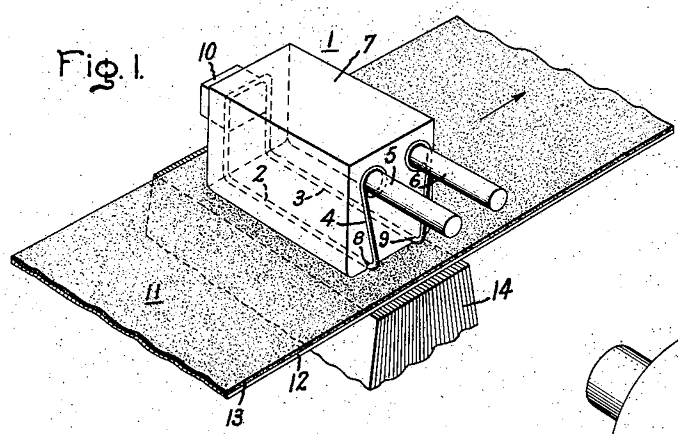

My invention relates in general to magnetic recording systems and in particular to magnetic recording and reproducing heads for perpendicular magnetic recording systems.

There are two basically different types of magnetic recording available in view of the fact that magnetization is expressed in flux or fields which must have vector designation. In one of these systems, the direction of magnetization lies for the greater part parallel to the motion of the recording medium, i. e., longitudinal with the surface of the material magnetized; in the other system, the direction of magnetization lies predominantly perpendicular to the motion and surface of the recording medium. Accordingly, the two types are called "longitudinal" and "perpendicular" recording respectively. In most commercial equipment, longitudinal magnetic recording systems have been employed in the past. However, with the development of magnetic storage components for binary digital computers and magnetic recording systems of similar nature, more attention has recently been given to perpendicular recording with the object of obtaining better resolution and speed of recording and playback, as well as greater storage per unit area of the recording medium.

It is an object of my invention to provide a new and improved magnetic head for recording of the perpendicular magnetic type.

It is a further object of my invention to provide a magnetic head for perpendicular recording which makes possible a more directional magnetizing field and better resolution.

It is a still further object of my invention to provide a magnetic head for perpendicular recording which produces a smaller size magnetic spot and allows more magnetic storage per unit area of recording medium for pulse type information such as that employed in binary digital computers.

And it is yet another object of my invention to provide a magnetic head for perpendicular recording which has very low inductance, permitting rapidly changing or high frequency signal current to be passed therethrough for faster recording.

In carrying out the foregoing objects of my invention I provide two series-connected parallel conductor portions carrying magnetizing signal current in opposite directions so that the resultant magnetic fields around the two conductor portions augment each other. The conductor portions are relatively closely spaced with respect to each other and also closely spaced with respect to the surface of a recording medium, which, as is well known for perpendicular recording systems, comprises a high retentivity material, such as iron oxide, backed by a highly permeable material, such as Permalloy. Essentially, then, the magnetic head comprises an electrical conductor loop carrying magnetizing signal current, two sides of the loop being spaced parallel and in close proximity to a recording medium. The loop may be supported on a block of insulating material so that no magnetic or electrically conductive material is present in the head itself; as a result of the loop forming a single turn of wire and the absence of any magnetic or conductive material, the inductance of the head is extremely low and no eddy current energy losses can occur therein. Preferably, however, the supporting block is made of a high resistivity, high permeability material such as ferrite, which permits more recording flux for a given signal current but has little eddy current loss therein. The high directivity of the recording field of this magnetic head which results in smaller magnetic spot size and better resolution will become more apparent as the description proceeds.

The scope of my invention is pointed out with particularity in the appended claims. However, for a better understanding of the invention, together with further objects and advantages thereof, reference should be had to the following description taken in conjunction with the accompanying drawing.

Figures 2, 4:
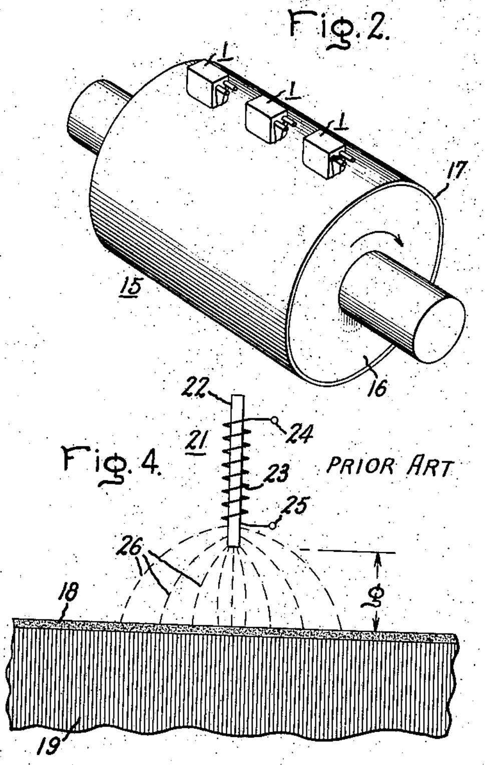
Figure 3:
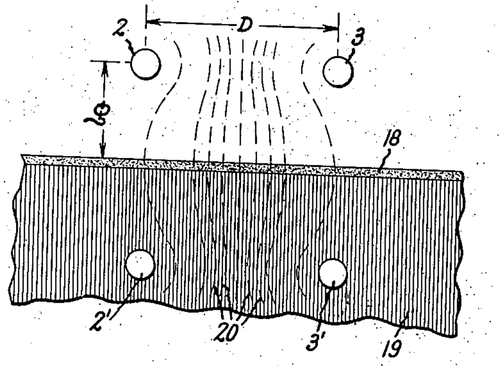
Figures 5, 6:
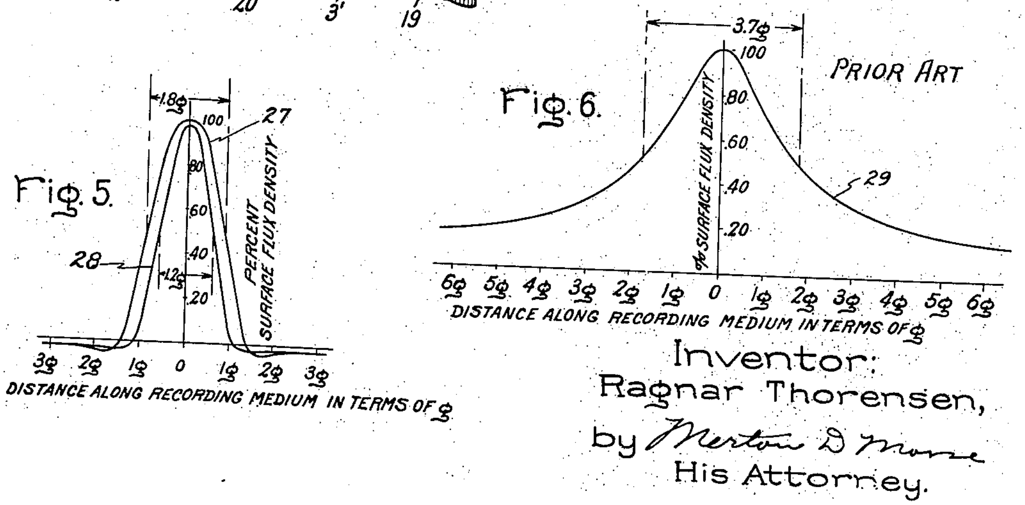

In the drawing, Fig. 1 is a perspective view, drawn to a large scale, of the magnetic recording head of my invention as applied to perpendicular tape recording; Fig. 2 is a perspective view showing the magnetic head of my invention as applied in perpendicular drum recording; Fig. 3 is a diagrammatic representation of the recording head of the present invention, together with the flux pattern produced thereby; Fig. 4 is a diagrammatic representation of a prior art type perpendicular magnetic recording head, together with a flux pattern produced thereby; Fig. 5 is a graph showing surface flux density for displacements along the surface of a recording medium, as produced by the head of the present invention; and Fig. 6 is similar to Fig. 5 except that it illustrates surface flux densities for similar displacements as produced by the prior art type head of Fig. 4.

Referring now to Fig. 1, one embodiment of a magnetic head 1 of the present invention is illustrated in detail, to a large scale, as applied in a magnetic tape recording system of the perpendicular type. Magnetic head 1 comprises two parallel conductor portions 2 and 3 connected serially, preferably formed, as shown, by a single conductor 4 in loop configuration with the end sections of the loop turned up and away at substantially right angles from the plane of conductor portions 2 and 3. The series loop combination of conductor portions 2 and 3 is provided with two terminals 5 and 6 for connection to a signal current supply circuit, not shown, the output signals of which are to be recorded magnetically. Conversely, when head 1 is employed as a reproducing means for signals previously magnetically recorded, terminals 5 and 6 are connected to a suitable amplifying and output utilization circuit, also not shown. A mounting block 7, made preferably of a nonconductive highly permeable material, such as ferrite, or made of any suitable nonmagnetic insulating material such as plastic or synthetic resin, supports conductor 4 with conductor portions 2 and 3 in spaced parallel relation, and preferably closely spaced relation. Terminals 5 and 6, to which the ends of conductor 4 are connected, may be suitably fastened into block 7, as shown, with the extremities of conductor 4 being bent essentially at right angles to conductor portions 2 and 3, which are positioned in grooves 8 and 9 provided in the lower face of block 7. A retaining projection 10 on the end of block 7 opposite terminals 5 and 6 serves to support the end of the loop formed by conductor 4, preferably with the end-loop section of conductor 4 bent essentially at right angles to portions 2 and 3 as shown. I prefer to make grooves 8 and 9 relatively shallow in depth so that conductor portions 2 and 3 project therefrom and to mount block 7 by any suitable means such as a bracket, not shown, so that portions 2 and 3 have a small clearance, of the order of .002 to .003 inch, from the surface of the recording medium. In this way, neither portions 2 and 3 nor block 7 contact the moving recording medium, causing wear thereof, and at the same time portions 2 and 3 may be closely spaced to the surface of the recording medium. However, if it is preferred, grooves 8 and 9 may be made somewhat deeper in order that portions 2 and 3 are flush with the lower surface of block 7, and the block 7 allowed to ride in intimate contact with the recording medium.

As illustrated in Fig. 1, the recording head 1 may be used for perpendicular recording on a tape 11 which is a moving recording medium. Tape 11 may be of any form well-known to those skilled in the art of magnetic tape recording. It may be a homogeneous metallic tape having relatively great retentivity and coercive force so that it retains magnetism induced therein as it moves past head 1; or it may include, as shown, a base portion 12 of a suitable material such as paper or plastic covered with a layer 13 of relatively great retentivity and coercive force material, such as powdered iron oxide. In order to aid the penetration of the magnetic field delivered by head 1, when excited, through tape 11, a highly permeable backing member 13, made of ferrite, Permalloy, mumetal, or materials of similar nature, and laminated to prevent excessive eddy currents therein, is positioned on the other side of tape 11 opposite head 1. Tape 11 may ride on backing member 14 if undue attrition to the tape or backing member does not result, or a very small clearance gap between tape 11 and backing member 14 may be provided.

In Fig. 2, a plurality of magnetic heads 1 are shown in a perpendicular drum magnetic recording system. The moving recording medium in this case is a cylindrical member or drum 15, which includes a highly permeable backing portion 16 made preferably of ferrite, Permalloy, mumetal, or material of like nature formed of axially stacked laminations to suppress eddy currents and covered with a layer 17 of relatively great retentivity and coercive force material such as powdered iron oxide. Heads 1 are preferably supported with a small clearance, in the order of .002 to .003 inch, from the surface of layer 17 by suitable means such as brackets, (not shown) although, as explained for Fig. 1, they may be made to ride in intimate contact with the surface of drum 15, if desired. As illustrated in Fig. 2 it is often desirable, in either tape or drum recording, to employ several heads spaced closely side by side in order to record information in parallel tracks on the recording medium. The ends of the loop are, therefore, bent upwardly from conductor portions 2 and 3 and from the recording medium surface to prevent cross interference between adjacent tracks and provide a recorded track sharply defined at its edges. The flux produced by the upturned ends of the conductor loop during recording by heads 1 is longitudinal to the recording medium surface and is thus entirely ineffective in causing perpendicular magnetism in the recording medium.

In recording operation, with either tape 11 or drum 15, the aiding magnetic fields, surrounding conductor portions 2 and 3, due to magnetizing signal current supplied to terminals 5 and 6, and flowing through conductor 4, penetrate the high retentivity and coercive force layers by being attracted perpendicularly into (or out of) the permeable backing material. The return path of the flux is a random one through the surrounding air space and backing material, the flux density being so reduced in the wide random return path as to be ineffective in causing any permanent magnetization. As the recording medium moves past head 1 and the signal current through conductor 4 varies, a perpendicular magnetic field pattern representing the signal current variations is induced in and retained by the high retentivity and coercive force layer. This layer, after recording, may thus be considered as made up of a series of perpendicularly oriented bar magnets of infinitesimal width placed side by side along the direction of travel, the field strength and polarization of each such bar magnet being proportional to signal current strength at the instant the magnet passed under the recording head, providing the layer is operated on a linear portion of its magnetization characteristic. Any of the well known biasing systems and erasing heads may be used in conjunction with head 1 in a complete recording system.

In playback operation, with either tape 11 or drum 15, the moving surface flux from the recording medium cuts conductor portions 2 and 3 and induces in conductor 4 a voltage proportional to the time derivative of the flux variation, which at constant velocity of the recording medium, is proportional to the space derivative of the flux variation along the surface of the recording medium. The voltage variations appearing at terminals 5 and 6 may thus be applied to an amplifier, if necessary, and thence to some utilization circuit.

The particular advantages of the loop type head of the present invention may best be seen by reference to Figs. 3, 4, 5 and 6, in which the present invention is analytically compared with the general type of perpendicular recording head used heretofore. In Fig. 3, the magnetic head of the present invention is represented by a sectional view of conductor portions 2 and 3, separated from each other by the distance D and from the recording medium by the gap $g$. The recording medium is represented as a high retentivity and coercive force layer 18, corresponding to layers 13 and 17 in Figs. 1 and 2, backed by high permeability portion 19, corresponding to member 14 and backing portion 16, in Figs. 1 and 2. For a given current flowing in opposite directions in portions 2 and 3, the resulting magnetic field and flux may be represented by lines 20 as shown, the permeability of portion 19 being taken into account in constructing the flux plot by employing the method of images, i. e., drawing in images 2′ and 3′ symmetrically located from portions 2 and 3, and making the field around each conductor portion and its image symmetrical. The concentration of the flux lines 20 midway between conductors 2 and 3 is apparent from Fig. 3, and will be further pointed out in connection with Fig. 5.

In Fig. 4, a conventional type perpendicular recording head 21 is illustrated comprising basically a highly permeable thin strip pole piece 22 around which there is wound a coil 23. Coil 23 is provided with terminals 24 and 25 for connection to signal current producing apparatus or to output amplification and utilization apparatus, not shown, during recording and reproduction respectively. Head 21 is essentially of the type described in United States Patents 2,532,808—Faus and 2,361,753—Eilenberger, and in various publications on magnetic recording. With minor modifications not changing the principle of its operation, it has heretofore been considered and used as the best type perpendicular recording head and it therefore is classed as prior art with respect to the present invention. The particular advantages and novel features of the present invention over the prior art type of magnetic head 21 will become apparent from the following paragraphs.

Head 21 is illustrated in conjunction with a recording medium having a layer 18 and high permeability portion 19 identical to those of Fig. 3, being similarly separated from the recording medium by a gap $g$. For a given current flowing in coil 23, it is known that the resulting magnetic flux and field may be represented as shown by lines 26.

It is to be understood that the magnetic head of the present invention may be used with advantage in recording and reproducing sound, such as speech and music. However, it finds special and more urgently needed application in magnetic storage components of binary digital computers, wherein a series of pulse signals must be rapidly recorded on and reproduced from a relatively small area of the recording medium. In order for the pulses to be rapidly recorded and reproduced, it is necessary that the recording medium surface move rapidly past the recording or reproducing head, for example, at speeds in the order of 4000 inches per second. Any contact of the head with a surface moving at such speeds would most certainly cause damaging wear to either the head or the surface. For these reasons, the heads and recording medium surfaces in Figs. 3 and 4 have been shown as being separated by a clearance gap $g$ and a comparison will be made on the basis of such a clearance gap. The clearance gap $g$, however, should in practice be kept as small as consistent with the mechanical accuracy of the recording medium and head supporting structures, and any vibrations likely to occur therein, the gap being closed entirely in cases where attrition is not excessive as a result.

Referring now to Fig. 5, I have shown a plot of the flux density occurring at the surface of the recording medium beneath the magnetic head of my invention for a given current flowing in conductor 4. The ordinates of the curves are expressed as a percentage of the maximum surface flux density which is located midway between portions 2 and 3; and the abscissae of the curve are expressed in terms of the gap dimension $g$ for displacements measured to the left and right of the midpoint between portions 2 and 3 along the direction of recording medium movement. It may be shown that the flux density along the surface of the medium is proportional to $1/x^2$ where $x$ is distance from the center of the head. Curve 27 illustrates such a flux density distribution along the surface of the recording medium for magnetic head 1, in which the distance D which separates portions 2 and 3 is equal to twice the gap dimension $g$. Curve 28 is the same except that D is equal to $g$. Notice that in both instances the curves are very sharply peaked at the center, indicating that the flux is considerably concentrated. If the magnetic spot size be defined as the distance between 50% points on the curve, the spot size for curve 27 is 1.8 times the gap dimension, or $1.8g$, and the spot size for curve 28 is 1.2 times the gap dimension, or $1.2g$. It is practical to consider a clearance gap $g$ of .003 inch and a separation distance D of $2g$, or .006 inch. With these dimensions, the spot size would be approximately .005 inch; and if the distance D were $g$, the spot size would be approximately .004 inch.

In Fig. 6, curve 29 illustrates the flux density variation curve for head 21 of conventional construction with a given current flowing in coil 23. It may be shown analytically that the surface flux density at displacements $x$ from the center of the head falls off as $1/x$. In a manner similar to that of Fig. 5, the ordinates of curve 29 are expressed as a percentage of the maximum flux density which occurs directly under pole piece 22, and the abscissae are expressed in terms of the gap dimension $g$ as displacements from pole piece 22 along the recording medium surface. It will be seen that curve 29 is much less peaked than curves 27 and 28, indicating that head 1 is more directive and a definite improvement over the prior head 21. The spot size for head 21 is seen to be 3.7 times the gap dimension, or 3.7 g. Assuming again a practical gap dimension of .003 inch, the magnetic spot size for head 21 is .011 inch, or roughly twice as large as the spot size indicated for curve 27. The resolution of the magnetic head of the present invention is, therefore, approximately twice as great as that of previous perpendicular recording heads.

The inductance of conductor 4 in loop configuration is very low since it forms a coil of only one turn, and the current therethrough may be changed rapidly in response to rapidly changing applied voltage. Further, there can be no eddy current energy losses in the head if block 7 is made of insulating material. To reduce the current required for a given magnetizing flux density, however, block 7 is preferably made of a high permeability, high resistivity material such as ferrite. Such a material aids in the establishment of magnetizing flux but is so highly electrically resistive that no appreciable eddy current losses occur therein and the conductor portions are effectively insulated from one another for the magnitude of voltages involved. The highly permeable backing portion, of course, contributes to the inductance and eddy current losses of the recording head, but these factors were present in the use of the prior art type head 21, and were augmented by the greater inductance of the multi-turn coil 23. In order to reduce the eddy current losses in the permeable backing portion, it is preferably made of a high resistivity, low loss material such as ferrite, and laminated as shown.

It is to be realized that head 1 must be supplied with more signal current to obtain the same magnetomotive force or ampere-turns than head 21, but as will be apparent to those skilled in the art, the greater current may be supplied at lower voltage and this can easily be accomplished through the use of a matching circuit or transformer when the current from a signal source is limited. The recording power required for this head is equal to or perhaps even less than the power required for the prior art type head 21. The head 1 of the present invention is, therefore, seen to give perpendicular recording in which a great number of pulses may be recorded with great rapidity upon a relatively short length of a recording medium track with sharply defined edges. In the case of pulse recording, as in binary digital computers, it may record as many as 200 pulses per inch of recording track length. The surface may be moved at speeds as high as 4000 inches per second past the head, and the head may thus record into the surface 800,000 pulses per second. This speed and large pulse storage per inch of recording medium surface are significant advantages in magnetic storage components of binary digital computers. However, it is to be understood that the present invention is not limited to pulse recording alone, but that the improved resolution it affords may be advantageous in recording sound and other information.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A magnetic head for perpendicular magnetic recording and reproducing, comprising a pair of conductor portions connected serially and spaced in parallel relation to each other and to the active surface of a magnetizable medium, said portions defining a plane parallel to the plane of said active surface, and two terminals for the series circuit formed by said conductor portions to receive magnetizing signal current, whereby said current flows in opposite directions in said conductor portions and the magnetic fields produced around each of said conductor portions jointly affect said medium and augment each other in the space between said conductor portions.

2. A magnetic head for perpendicular magnetic recording and reproducing, comprising a single conductor in loop configuration, said loop defining a plane parallel to the active surface of a magnetizable medium, two terminals for said conductor for receiving magnetizing signal current, said conductor having two conductor portions in parallel spaced relation and arranged to carry said signal current in opposite directions, whereby the magnetic fields around each of said conductor portions augment each other in the space between said conductor portions and form a highly directive and concentrated composite magnetic field oriented in a direction perpendicular to the plane of said conductor portions.

3. In a perpendicular magnetic recording and reproducing system, a magnetic head comprising a mounting block of high permeability-high resistivity material, a single conductor mounted in elongated loop configuration on said block, two terminals on said block connected to said conductor to receive and conduct magnetizing signal current therethrough, said block having two grooves in parallel spaced relation in one face thereof, and said conductor having two conductor portions disposed in said grooves and the end sections of the loop formed by said conductor bent at essentially right angles to the plane of said portions, whereby the magnetic fields produced around said portions by said signal current augment each other in the space between said portions in a direction perpendicular to the plane of said portions.

4. In a perpendicular magnetic recording and reproducing system including a recording medium having a layer of high retentivity-high coercive force material backed by a portion of high permeability material, a magnetic head comprising a mounting block of insulating material, a single conductor mounted on said block in loop configuration, two terminals on said block to receive and conduct magnetizing signal current through said conductor, said block having two grooves in parallel closely spaced relation in one face thereof, said conductor having two conductor portions disposed in said grooves to carry said signal current in opposite directions and the end sections of the loop formed by said conductor bent at essentially right angles to the plane of said grooves, and said block being fixed in closely spaced relation to said recording medium with said one face thereof parallel to the surface of said recording medium.

5. In a perpendicular magnetic recording and reproducing system including a recording medium having a surface layer of high retentivity-high coercive force material backed by a portion of high permeability laminated material and having said surface layer adapted to have motion in a direction parallel to the surface thereof, a magnetic head comprising a mounting block of high permeability-high resistivity material having two parallel grooves in closely spaced relation in one face thereof, a single conductor mounted in elongated loop configuration on said block to receive magnetizing signal current, said conductor having two straight conductor portions, said conductor portions being disposed one in each of said grooves to carry said signal current in opposite directions, said conductor having end sections forming said loop, said end sections being bent at substantially right angles to the plane of said portions, said mounting block being fixed in closely spaced relation to the moving surface of said recording medium with the plane of said conductor portions parallel to the plane of said surface and the directions of current flow through said conductor portions perpendicular to the direction of motion of said surface.

6. In a perpendicular magnetic recording and reproducing system, a magnetic head comprising a mounting block, a conductor mounted in elongated loop configuration on said block, terminals on said block connected to said conductor to conduct a signal current therethrough, said block having two grooves in parallel spaced relation in one face thereof, and said conductor having two conductor portions disposed in said grooves and the end sections of the loop formed by said conductor bent at essentially right angles to the plane of said portions, whereby the magnetic fields produced around said portions by said signal current augment each other in the space between said portions in a direction perpendicular to the plane of said portions.

7. A magnetic head comprising a single conductor arranged in elongated loop configuration, means to support said loop parallel to the surface of a magnetizable medium, terminals connected to said conductor to apply a signal current thereto, said conductor having the end sections of the loop formed by said conductor bent at essentially right angles to the plane of said loop, whereby the magnetic fields produced around said end sections are effectively eliminated from the fields produced around said loop.

8. In a magnetic pickup and recording device, a filamentary conductor adapted to be supported in a continuous loop and to conduct a signal current therethrough, the plane of said loop being parallel to that of a magnetizable medium, and a mounting member for said conductor, said member being of a high-permeability, high-resistivity material, whereby to provide increased magnetic field strengths for a given signal current and to minimize eddy current loss in said member.

References Cited in the file of this patent

UNITED STATES PATENTS

| Number | Name | Date |
| --- | --- | --- |
| 2,247,847 | Pfleumer ----------- | July 1, 1941 |

FOREIGN PATENTS

| Number | Country | Date |
| --- | --- | --- |
| 612,450 | Germany ---------- | Apr. 25, 1935 |